United States Patent [19] [11] 3,882,973
Hakes [45] May 13, 1975

[54] AUTOMATIC RETARDER CONTROL SYSTEM
[75] Inventor: Gary A. Hakes, Peoria Heights, Ill.
[73] Assignee: Caterpillar Tractor Company, Peoria, Ill.
[22] Filed: Aug. 9, 1973
[21] Appl. No.: 387,159

Related U.S. Application Data
[63] Continuation of Ser. No. 273,183, July 19, 1972, abandoned.

[52] U.S. Cl. ............... 188/181 R; 60/328; 60/343; 188/274; 188/290; 303/21 CF
[51] Int. Cl. ............................................ B60t 8/12
[58] Field of Search ........ 188/181 R, 181 C, 181 A, 188/274, 264 E, 290, 296; 60/343, 328; 73/134; 303/21 R, 21 CF, 21 FP

[56] References Cited
UNITED STATES PATENTS
2,249,389  7/1941  Kolb ................................. 137/49 X
2,362,682  11/1944  Watson ................................ 73/134
3,024,876  3/1962  Montgomery ...................... 188/274

FOREIGN PATENTS OR APPLICATIONS
660,993  4/1963  Canada ............................... 188/296
466,436  5/1937  United Kingdom ................ 188/296

Primary Examiner—George E. A. Halvosa
Attorney, Agent, or Firm—Phillips, Moore, Weissenberger, Lempio & Strabala

[57] ABSTRACT

A control system for a retarder in a vehicular drive train including a transmission gear ratio assembly having a power input shaft coupled with an engine and a power output shaft for driving the vehicle, the retarder having a rotor coupled for rotation with the power input shaft, the control system including a fluid pump, a valve responsive to speed sensing means in order to automatically condition the retarder for power absorption during excessive rotational speed in the drive train and signal means indicating when the maximum absorption capacity of the retarder is being employed.

1 Claim, 2 Drawing Figures

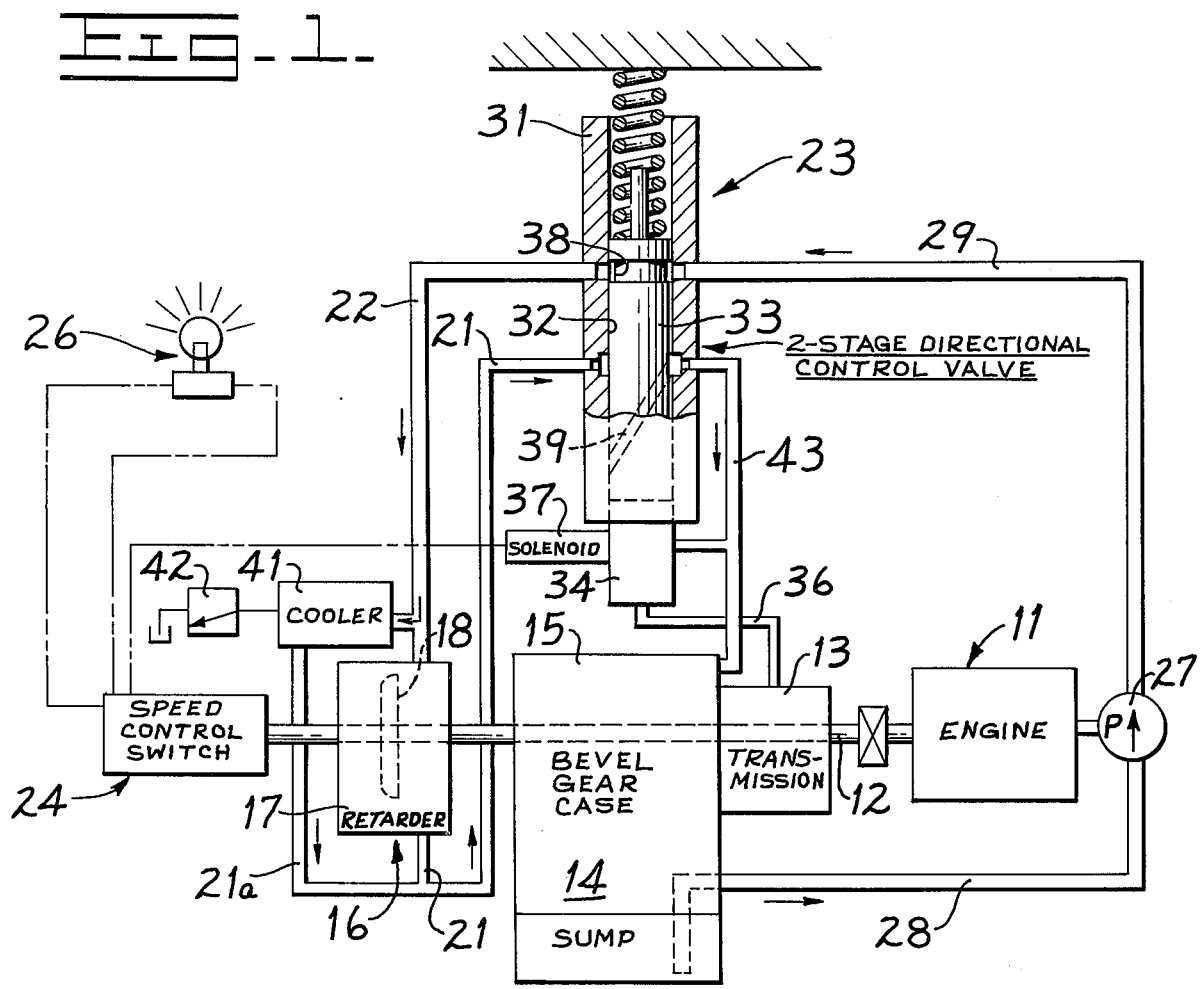

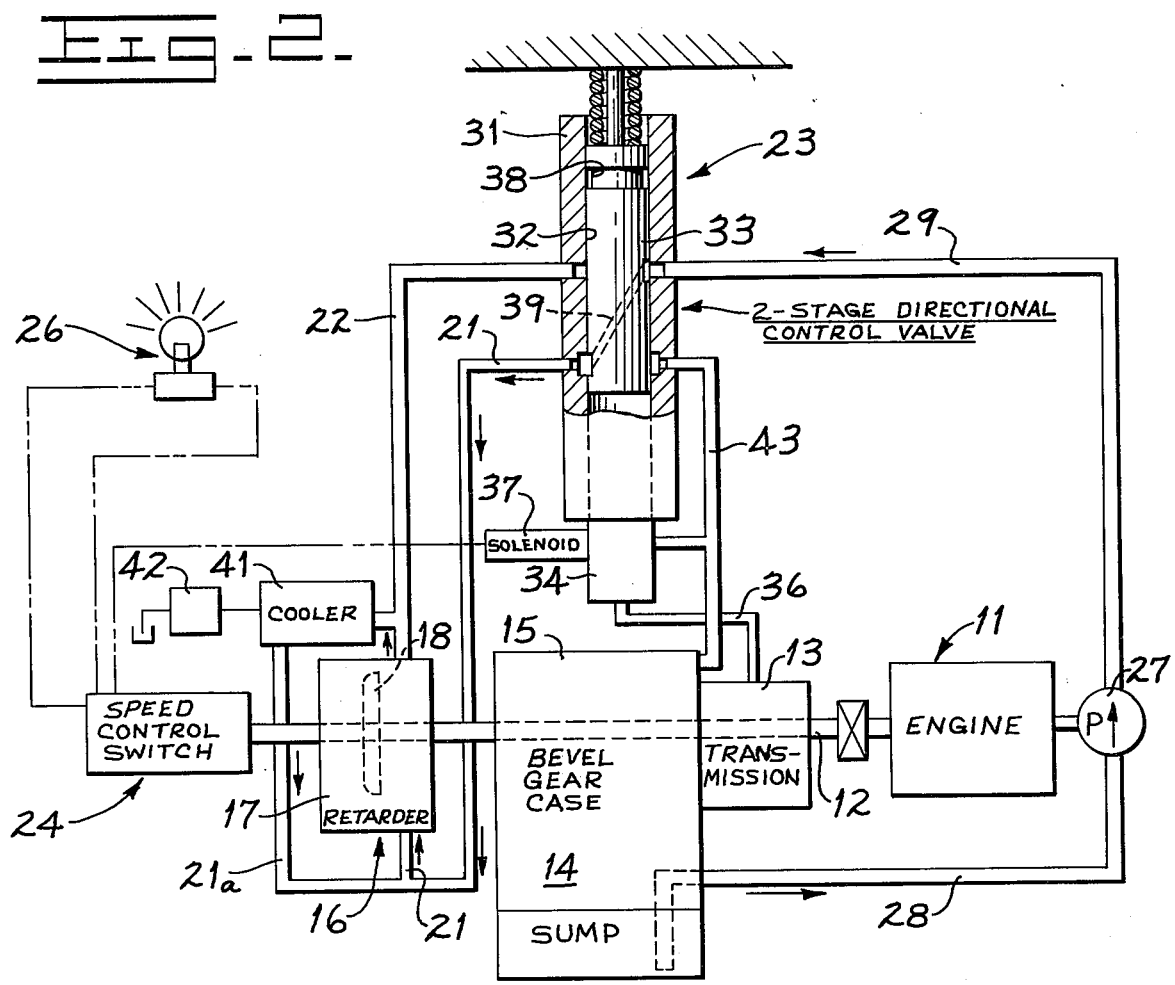

AUTOMATIC RETARDER CONTROL SYSTEM

This is a continuation of Serial No. 273,183, Filed July 19, 1972, now abandoned.

BACKGROUND OF THE INVENTION

The present invention relates to a control system for automatically regulating operation of a retarder in a vehicular drive train in order to limit operating speeds within the drive train, particularly when the vehicle is being driven by other than its prime mover. A particular example of such a condition tending to cause overspeeding within the drive train arises when the vehicle is traveling downhill.

The present invention also particularly contemplates the use of a fluid retarder within the drive train. Such retarders may consist of closely spaced, relatively rotatable parts within a fluid housing. In order to condition the retarder for power absorption within the drive train, the housing is filled with fluid. Movement of the closely spaced parts through the fluid converts horsepower from the drive train into heat which is normally dissipated by circulating fluid from the retarder through a suitable heat exchanger.

In many vehicles, for example those employed in heavy construction and having power shift transmissions, excessive rotating speed within the drive train is particularly undesirable because of the damage which may arise within the transmission as well as from loss of operator control over the vehicle. The operator of such a vehicle is, of course, occupied with many duties and he may be initially unaware that a portion of the drive train is operating at excessive speeds.

SUMMARY OF THE INVENTION

It is accordingly an object of the present invention to provide for automatic control over a retarder within a drive train to minimize excessive operating speeds within the drive train. To accomplish this object, the present invention provides a control system for such a retarder, the control system including a valve responsive to speed sensing means associated with a rotating part in the drive train to automatically condition the retarder for power absorption relative to operating speeds of the rotating part.

It is a further object of the present invention to provide signal means within such a control system for providing an indication to the operator of when the maximum power absorption capacity of the retarder is being employed. For example, in heavy construction or earth-moving vehicles of the type referred to above, it may at times be necessary to absorb very large amounts of power in order to maintain control over speed of the vehicle and its drive train. It is again noted that the operator may not be aware of conditions when the maximum capacity of the retarder is being employed. At such times, the vehicle and its drive train may experience excessive operating speeds even through the retarder is energized. Accordingly, the signal means may be employed to indicate this condition to the operator, enabling him to employ manually operated means, for example, the vehicle brakes, in order to maintain the operating speed of the vehicle and its drive train within a proper range.

Other objects and advantages of the present invention are made apparent in the following description having reference to the accompanying drawings.

DESCRIPTION OF THE DRAWINGS

In the drawings:

FIG. 1 is a schematic representation of a control circuit for a retarder in a vehicular drive train, the retarder being uncharged so that it is substantially ineffective for absorbing power; and FIG. 2 is a similar view of the retarder control circuit with the retarder being energized or filled with fluid to condition it for power absorption.

DESCRIPTION OF A PREFERRED EMBODIMENT

Referring now to the drawings, conventional components of a vehicular drive train may include a prime mover or engine 11 coupled with an input shaft 12 for a gear ratio transmission 13. A power output for the transmission 13 may take the form of a bevel gear assembly 14 having a housing 15 and being coupled with driven ground wheels (not shown).

A fluid retarder 16 of the type contemplated by the present invention, includes a fluid housing 17 with internal rotor means 18 being coupled for rotation with the power input shaft 12 of the transmission. A fluid conduit 21 provides a fluid inlet for the retarder while another conduit 22 provides an exit for fluid from the retarder housing.

A control circuit for the retarder, according to the present invention, basically includes a valve 23 responsive to a speed sensing unit or electrical switch 24 which in turn is associated with a rotating part of the drive train such as the input shaft 12. Through suitable fluid communication as described below, the valve may thus automatically condition the retarder to absorb power from the drive train in relation to the rotating speeds of the input shaft 12. A signal means 26 is also associated with the speed sensing switch 24, a centrifugally operated electrical switch, for example, to indicate when the maximum power absorbing capacity of the retarder 16 is being employed. Various features of the control circuit as well as its mode of operation are described in greater detail below.

A pump 27 driven by the engine 11 draws fluid from a sump, for example, in the bevel gear assembly 15, through a conduit 28 and directs that fluid under pressure through a conduit 29 to the valve 23. The valve 23 has a housing 31 forming a bore 32 with a spring-centered spool 33 being movably arranged therein. The valve bore 32 is in communication with the conduit 29 as well as the inlet and outlet conduits 21 and 22 for the retarder 16. A pilot valve 34 is arranged at one end of the valve body 31 and is operable by fluid from a conduit 36 for shifting the spool 33 against its spring. For purposes of the present invention it is sufficient to understand that a constant supply of fluid under pressure is available in the conduit 36 from the transmission means 13. The pilot valve 34 is operated by a solenoid 37 which is responsive to the speed sensing switch 24 to open the valve 34 and allow fluid pressure from the conduit 36 to shift the valve spool 33 upwardly.

A heat exchanger or cooler 41 is also in communication with the conduit 22 and with a relief valve 42.

When the pilot valve 34 is closed and the spool 33 is positioned by its spring, the conduit 29 is communicated with the conduit 22 by an annular groove 38 in the spool 33 and the conduit 21 is in communication with another conduit 43 for returning fluid to the bevel gear sump. With the valve 23 in this condition, fluid from the pump 27 passes through the heat exchanger 41 and returns to the sump through a branch conduit 21a, the conduit 21 and the conduit 43. Fluid flow through the retarder is substantially limited to a single direction, from the inlet conduit 21 to the outlet conduit 22. The branch conduit 21a in combination with a portion of the conduit 21 and a portion of the conduit 22 thus forms a closed loop so that when the valve 23 is in the condition shown in FIG. 1 a small amount of fluid circulates through the retarder at approximately 5 psi to lubricate and cool moving parts therein.

When the valve spool 33 is shifted upwardly to the position shown in FIG. 2 by the pilot valve 34, fluid from the pump conduit 29 is communicated into the conduit 21 thru passage 39 while the conduit 29 is blocked from communication with the pump conduit 29. Accordingly, fluid from the pump 27 flows through the retarder 16, to develop a pressure of, for example, 30 psi therein, then through the heat exchanger 41 and the relief valve 42 to be returned to the drain or sump.

In operation, the engine 11 and accordingly the input shaft 12 may have a normal operating speed range of, for example, 1,800 to 2,100 rpm. To prevent or minimize high speed operation within the drive train, the speed sensing switch 24 may be set to energize the solenoid 37 when the input shaft 12 is operating at a speed of 2,200 rpm for example. When that speed of rotation is obtained by the input shaft 12, the speed sensing switch 24 energizes the solenoid which in turn opens the pilot valve 34 and allows the valve spool 33 to be shifted upwardly. Fluid from the pump 27 then flows through the retarder which absorbs power from the drive train and tends to slow down the vehicle.

The maximum power absorbing capacity of the retarder 16, in the embodiment illustrated, is selected to match the maximum power transmission capacity of the transmission 13. For example, the retarder 16 may be selected to have a maximum absorption capacity of approximately 300 horsepower.

The signal means or lamp 26 is provided to signal the vehicle operator when the absorption capacity of the retarder 16 is being exceeded. For example, when the input shaft 12 reaches a rotating speed of 2,400 rpm for example, this relatively high speed indicates that the retarder cannot absorb all power being introduced into the drive train and the excessive power causes the increased rotating speed. Accordingly, the speed sensing switch 24 energizes the signal 26 at the higher speed so that the operator is aware of the condition. He may then choose to employ additional means such as the vehicle brakes (not shown) in order to maintain operating speeds of the vehicle and drive train within suitable limits.

The signal lamp 26 and the solenoid 37 are respectively de-energized by the speed sensing switch 24 as the rotating speed of the input shaft 12 drops below 2,400 rpm and then below 2,200 rpm. When the signal lamp 26 is no longer energized, the operator may assume that the retarder is sufficient by itself to limit speed of the drive train and vehicle. When the solenoid 37 is de-energized, the pilot valve 34 is closed and the valve spool 33 is again returned by its spring to the position shown in FIG. 1. The control circuit is then in a condition to once more sense excessive speed in the drive train and to energize the retarder 16 and the signal lamp 26 according to operating conditions.

What is claimed is:

1. A retarder system for a vehicular drive train including a transmission gear ratio means having a power input shaft coupled with a prime mover and a power output means for driving the vehicle, comprising a retarder of maximum power absorption capacity having a rotor means coupled for rotation with the power input shaft, the retarder also having an inlet conduit and an outlet conduit, a bypass conduit communicating the retarder inlet and outlet conduits, a heat exchanger in the bypass conduit and including a relief valve for selectively communicating the heat exchanger with a fluid sump, speed sensing means associated with a rotating part in the drive train, a valve coupled for response to the speed sensing means, the valve being responsive to the speed sensing means for movement to a first power absorption position for communicating the source with the retarder inlet conduit, fluid from the source flowing through the retarder, the heat exchanger and the relief valve included therein, and for movement to another position for communicating the source with the retarder outlet conduit and also for communicating the retarder inlet conduit with a fluid sump in order to substantially bypass the retarder while directing fluid through the heat exchanger and maintaining reduced fluid flow through the retarder for cooling and lubrication, and signal means operatively coupled with the retarder to indicate when its maximum capacity is being employed.

* * * * *

UNITED STATES PATENT OFFICE
CERTIFICATE OF CORRECTION

PATENT NO. : 3,882,973
DATED : May 13, 1975
INVENTOR(S) : Gary A. Hakes

It is certified that error appears in the above-identified patent and that said Letters Patent are hereby corrected as shown below:

On the Title Page, Item [73], change the spelling of the assignee's corporate name from "Caterpillar Tractor Company" to ---Caterpillar Tractor Co.---.

Signed and Sealed this twenty-fifth Day of November 1975

[SEAL]

Attest:

RUTH C. MASON
*Attesting Officer*

C. MARSHALL DANN
*Commissioner of Patents and Trademarks*